United States Patent
Stott et al.

(10) Patent No.: US 9,827,893 B2
(45) Date of Patent: Nov. 28, 2017

(54) BUS HAND POLE

(71) Applicant: Alexander Dennis Limited, Camelon Falkirk (GB)

(72) Inventors: David Stott, Skelmersdale (GB); Jeremy Turner, Skelmersdale (GB); John Trumper, Skelmersdale (GB)

(73) Assignee: Alexander Dennis Limited, Falkirk (GB)

( * ) Notice: Subject to any disclaimer, the term of this patent is extended or adjusted under 35 U.S.C. 154(b) by 0 days.

(21) Appl. No.: 15/030,341

(22) PCT Filed: Oct. 16, 2014

(86) PCT No.: PCT/GB2014/053107
§ 371 (c)(1),
(2) Date: Apr. 18, 2016

(87) PCT Pub. No.: WO2015/056017
PCT Pub. Date: Apr. 23, 2015

(65) Prior Publication Data
US 2016/0257233 A1 Sep. 8, 2016

(30) Foreign Application Priority Data
Oct. 16, 2013 (GB) .................................. 1318322.3

(51) Int. Cl.
*B25G 1/04* (2006.01)
*B60N 3/02* (2006.01)
*B60R 13/02* (2006.01)

(52) U.S. Cl.
CPC .............. *B60N 3/026* (2013.01); *B60R 13/02* (2013.01)

(58) Field of Classification Search
CPC ....... Y10T 16/498; Y10T 16/50; B60N 3/026; B60N 3/02; B60N 3/023; B60N 2/24; B60N 2002/247; B60R 13/02; A60G 7/053; A47K 17/022; A61G 7/1044; A47B 96/1425; A63B 21/1681; A63B 2244/225
See application file for complete search history.

(56) References Cited

U.S. PATENT DOCUMENTS 1,932,099 A * 10/1933 Cabana ................. A47L 13/252
15/143.1
1,978,960 A * 10/1934 Schlegel ................ B61D 49/00
105/354

(Continued)

FOREIGN PATENT DOCUMENTS

DE 197 47 704 A1 5/1999
DE 10 2010 033398 A1 2/2012

(Continued)

*Primary Examiner* — Chuck Mah
(74) *Attorney, Agent, or Firm* — Young Basile Hanlon & MacFarlane, P.C.

(57) ABSTRACT

A hand pole and socket arrangement (1) for use in a passenger service vehicle includes a hand pole (3) having a first end (2) and a first socket (4) for fitting to a passenger vehicle and for receiving the first end of the hand pole. The first end (2) of the hand pole and the first socket (4) are formed and arranged to prevent rotation of the hand pole relative to the socket when they are fitted together. A passenger service vehicle including the hand pole and socket arrangement (1) is also provided.

18 Claims, 3 Drawing Sheets

(56) References Cited

U.S. PATENT DOCUMENTS

| | | | | |
|---|---|---|---|---|
| 2,139,852 A * | 12/1938 | Rossell | | B60N 2/242 |
| | | | | 297/183.6 |
| 4,498,204 A * | 2/1985 | Warner | | A47K 3/003 |
| | | | | 4/254 |
| 4,570,545 A * | 2/1986 | Sherrow | | B61D 1/04 |
| | | | | 105/345 |
| 4,765,766 A * | 8/1988 | Heitmann | | B25G 1/06 |
| | | | | 15/144.1 |
| 5,690,237 A * | 11/1997 | Marzec | | A47K 3/003 |
| | | | | 211/105.1 |
| 5,791,634 A * | 8/1998 | Brown | | B60R 3/005 |
| | | | | 256/1 |
| 5,826,847 A * | 10/1998 | Warner | | F16B 37/0821 |
| | | | | 248/200.1 |
| 6,131,979 A * | 10/2000 | McGhee | | B61D 37/00 |
| | | | | 296/1.02 |
| 6,343,808 B1 * | 2/2002 | Luh | | B60D 1/06 |
| | | | | 280/511 |
| 6,925,686 B2 * | 8/2005 | Heathcock | | B25G 1/04 |
| | | | | 15/144.4 |
| 7,124,451 B2 * | 10/2006 | Moore | | A47K 3/003 |
| | | | | 211/105.1 |
| 7,211,001 B2 * | 5/2007 | Motyka | | F41B 15/06 |
| | | | | 463/47.2 |
| 7,523,993 B1 * | 4/2009 | Daneault | | B60N 2/242 |
| | | | | 244/118.5 |
| 7,681,463 B2 * | 3/2010 | Watanabe | | B62D 5/0463 |
| | | | | 180/446 |
| 7,971,835 B2 * | 7/2011 | Ehrman | | B60R 11/02 |
| | | | | 248/122.1 |
| 8,393,020 B2 * | 3/2013 | Grant | | A47K 3/003 |
| | | | | 16/436 |
| 8,533,912 B2 * | 9/2013 | Tran | | A47B 95/02 |
| | | | | 16/110.1 |
| 2002/0116791 A1 | 8/2002 | Grady et al. | | |
| 2007/0086852 A1 * | 4/2007 | Goad | | A47K 17/022 |
| | | | | 403/292 |
| 2008/0222790 A1 * | 9/2008 | Grant | | A47K 3/003 |
| | | | | 4/576.1 |

FOREIGN PATENT DOCUMENTS

| | | |
|---|---|---|
| GB | 727 908 A | 4/1955 |
| GB | 811 730 A | 4/1959 |
| WO | 2009041768 A2 | 4/2009 |

* cited by examiner

BUS HAND POLE

CROSS-REFERENCE TO RELATED APPLICATIONS

This application is a National Stage Application of International Application No. PCT/GB2014/053107 filed on Oct. 16, 2014, which claims the benefit of United Kingdom Patent Application No. GB 1318322.3 filed on Oct. 16, 2013.

FIELD OF THE INVENTION

The invention relates to the field of passenger service vehicles. In particular, but not exclusively, the invention relates to hand poles installed in passenger vehicles to assist passengers when remaining standing as the vehicle moves and in walking about the interior of the vehicle.

BACKGROUND TO THE INVENTION

As used herein, the term "passenger service vehicle" encompasses vehicles for transporting passengers and, in particular, road vehicles for transporting passengers. Exemplary passenger service vehicles may be buses, coaches or the like.

Passenger service vehicles are often operated in fleets, with the vehicles being centrally serviced or maintained such as at a fleet depot.

Significant innovation and technology development has occurred in recent years in relation to the design of passenger service vehicles. In particular, there has been a continued drive towards providing vehicles that allow for, for example, improved passenger accommodation, vehicle handling, fuel efficiency, and ease of maintenance, etc.

In a typical passenger vehicle, when moving between sitting and standing positions, and when travelling in a standing position, hand poles are provided at frequent intervals in the vehicle interior. They provide readily grasped, secure hand holds for passengers. The requirement for hand poles is often mandated by regulations in a given country.

Typically, hand poles are generally vertically disposed and running from floor to ceiling or, often, from a seat back to ceiling within a vehicle. In modern passenger vehicle designs, the hand poles may be curved, for example, to provide more space and more comfortable gripping by a standing passenger and may, in some arrangements, include one or more bends.

Fittings within the passenger compartment of a passenger vehicle, such as hand poles, are desirably robust, low maintenance, tamper resistant and do not present edges, projections or nips where passengers, their clothing or their belongings can be harmed or damaged.

DESCRIPTION OF THE INVENTION

According to a first aspect, the present invention provides a hand pole and socket arrangement for use in a passenger service vehicle, the arrangement comprising:
a hand pole having a first end; and
a first socket for fitting to a passenger vehicle and for receiving the first end of the hand pole,
wherein the first end of the hand pole and the first socket are formed and arranged to prevent rotation of the hand pole relative to the socket when they are fitted together.

The pole will typically be a metal tube that may be coated with a plastic surface layer. The plastic surface layer may be textured to improve passenger grip.

Prevention of rotation of a hand pole is an important consideration as passengers require secure fixed fittings that they can grasp to support themselves on a moving vehicle. A rotating pole does not provide a secure grasping place. The situation is more dangerous when the hand pole is curved or has bends in it. Rotation about the ends of the hand pole gives a lateral displacement of the grasping place as the pole rotates.

In addition, hand poles are frequently fitted between a seat back and the ceiling of a passenger vehicle. In use, the seat back flexes, changing the distance between the ceiling and the seatback. The hand pole and associated fittings, such as sockets, must be sufficiently compliant to cope with expected increase and decrease of the ceiling to seatback distance as the vehicle is used.

This can be achieved by providing a ceiling socket in which the ceiling end of the hand pole may move up and down, i.e., the ceiling socket encircles the end of the hand pole sufficiently far along its length to retain the pole end under all normal working conditions. Even where fitted in other places, for example between a ceiling and a floor of the passenger vehicle, some flexing of the distance between the two end points of a hand pole arrangement (e.g., the socket locations) may be experienced, requiring some compliance in the hand pole and associated fittings.

A prior art approach to prevent rotation has been to drill a hole through a socket and the end of a hand pole received within it. A fixing, such as a rivet or a bolt, is inserted to prevent rotation between the pole and the socket. However, such a fixing has externally visible parts (rivet ends, bolts or nuts) which may catch on passengers, their clothing or belongings unless made smooth or covered by further fittings. Furthermore, making a hole transversely through a generally cylindrical socket weakens it and may lead to cracking or breaking, especially when pressure is applied to the pole by passengers, and even more especially when the pole is curved or includes a bend or bends and the lever force applied by passenger activity is therefore greater.

The prevention of rotation between a first end of the hand pole and its corresponding first socket may be achieved in accordance with the invention by providing a radially outwardly extending projection on the hand pole end and a corresponding radially outwardly extending depression on the interior wall of the socket. The projection fits in the depression, preventing relative rotation of the socket and pole end in use. Alternatively, a radially inwards projection on the inside wall of the socket may fit into a radially inwards depression on the end of the hand pole to prevent relative rotation. With either of these alternatives, the parts that prevent rotation need not be externally visible, as they are contained inside the socket body.

More than one projection and corresponding depression pair may be employed, for example, two diametrically opposed projections and corresponding depressions.

The projection or projections employed may be resiliently biased towards the corresponding depression, for example, by being spring loaded. This biasing maintains firm contact between the projection and depression, reducing or preventing rattling caused by engine vibration.

Advantageously, the first socket and first end of the hand pole are formed and arranged to both prevent rotation of the hand pole relative to the socket and also to be sufficiently compliant to cope with expected increases and decreases of the distance between end points such as socket locations on, e.g., the ceiling and a seatback of a passenger vehicle.

This can be achieved by providing a radially outwardly extending projection on the hand pole first end and a corresponding radially outwardly extending depression on the interior wall of the first socket that is in the form of an axially extending groove. Axial motion of the pole relative to the socket can occur as the projection can move back and forth along the groove. As the distance between the points of attachment to the vehicle of the sockets (or other fixings) at either end of the hand pole changes, the relative motion allowed by the projection and groove arrangement prevents damage. At the same time, the projection fits in the groove preventing relative rotation of the socket and pole end in use.

Alternatively, a radially inwards projection on the inside wall of the socket may fit into a radially inwards depression that is in the form of an axially extending groove on the outer surface of the first end of the hand pole to prevent rotation but to allow axial motion of the pole relative to the socket. With either of these alternatives, the parts that prevent rotation need not be externally visible, as they are contained inside the socket body.

With either of these two alternatives, the first socket is conveniently fixed to the uppermost (e.g., the ceiling) end of the hand pole. The other, lower end of the hand pole may rest under gravity against the base of a socket or other fixing it connects to. The lower end of the hand pole may rest on a part of the seat back or the floor of the passenger vehicle, where the second socket (or other second fixing) does not have a base. By providing the arrangement with the first socket and first end of the hand pole uppermost, typically fixing to the ceiling of a passenger vehicle, the relative axial motion of the first socket and first end of the hand pole is generally out of the passengers' grasp region. This avoids the socket and pole junction from catching a passenger's clothing.

Conveniently, the first socket may be attached to a ceiling by means of fixings such as bolts through flanges extending laterally of the socket. The flanges may be concealed in a groove of a ceiling fitting that allows the socket to be attached at any point along the groove. The flanges may then be covered by a protective and or decorative sheeting to present an appearance without externally visible fixing components.

In a particularly convenient arrangement, the first end of the hand pole is provided with a spring-loaded projection to fit in a corresponding axially extending groove on the inside surface of the first socket. The spring-loaded projection may take the form of a spring-loaded pin such as are commercially available. The spring-loaded pin may be inserted radially into the hand pole transverse to its longitudinal axis. Even more conveniently and as illustrated by example hereafter, the spring-loaded pin may be inserted through a diameter of the hand pole to provide two diametrically opposed outwards projections that fit into corresponding axial grooves in the inside wall of the first socket. This arrangement provides firm contact between the projections and grooves, reducing or preventing rattling caused by engine vibration, even as the hand pole and first socket move up and down relative to each other.

In such an arrangement, the spring-loaded pin may be single or double ended, i.e., be provided with one end that can move inwardly and outwardly with respect to the pin body or be provided with two ends, each of which can move inwardly and outwardly with respect to the pin body.

In arrangements of the invention, the second end of the hand pole may have a second end of the same type as the first end for fitting into a corresponding second socket. The second socket and second end are, in this case, formed and arranged to prevent rotation of the hand pole relative to the socket. They may also be formed and arranged to be compliant to allow some axial movement of the second pole end in the second socket.

Alternatively, for example, the second end of the hand pole may simply be circular in cross section and may fit, in use, to a second socket that receives and holds it in place when fitted to a suitable location in a passenger vehicle. In such an example, only the first socket and first end of the hand pole prevent rotation of the hand pole.

In a yet further example, the second end of the hand pole may be clamped in a second socket and so not readily able to rotate. However, whilst such an arrangement may be effective in preventing easy movement of the pole end (e.g., preventing rattling due to vibration from the vehicle motor), it may not be effective in preventing rotation of the pole over a period of time when under pressure from frequent passenger use. Therefore, the effective prevention of rotation is provided by the first socket and first hand pole end and their interlocking engagement by projections/grooves.

Whilst the hand pole and socket arrangements described herein find use in passenger vehicles, it will be appreciated that they may be employed in any situation where prevention of rotation and/or compliance with a varying distance between the end points of a hand pole arrangement is/are desired.

The present invention also provides a passenger service vehicle comprising one or more hand pole and socket arrangements as discussed herein. The passenger service vehicle may typically be a road vehicle such as a bus or coach. However other road vehicles such as trams are also contemplated, as are other track vehicles such as trains. The invention may also be employed with water craft such as boats and ships, used as passenger service vehicles.

BRIEF DESCRIPTION OF THE DRAWINGS

A description is now given, by way of example only, with reference to the accompanying drawings, in which.

DETAILED DESCRIPTION OF THE INVENTION

Figure 1A:
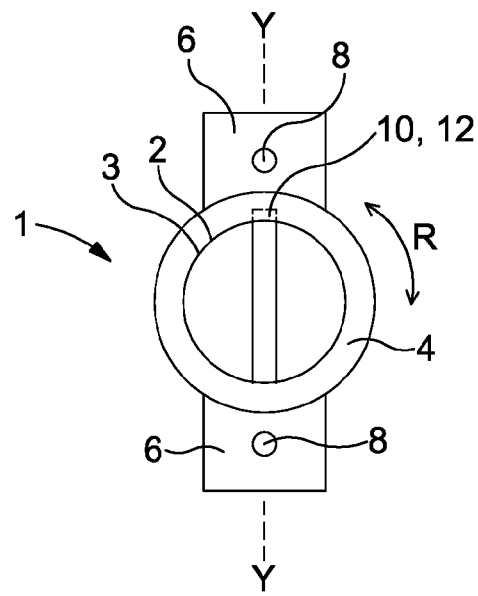
FIGS. 1A and 1B show in plan and cross section elevation views one end of a hand pole and socket arrangement.
Figure 1B:
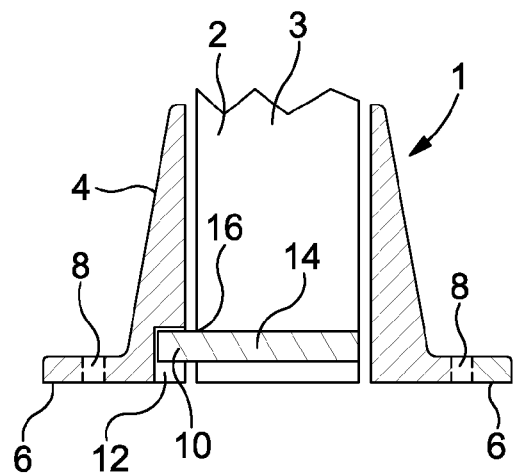

FIG. 1A shows an end of a hand pole and socket arrangement 1 in schematic plan view with a corresponding schematic cross section elevation about Y-Y shown in FIG. 1B. In the arrangement of FIGS. 1A, 1B, a first end 2 of a cylindrical hand pole 3 is received in a first socket 4, which is generally conical in form with a cylindrical inner surface 5. Flanges 6 are provided with bolt holes 8 for fixing to a floor of a passenger vehicle. Alternative fixing arrangements for attaching first socket 4 to a seat back in the known manner could be provided if desired.

A projection 10 extending radially outwardly of the first end of the pole 2 fits inside a corresponding depression 12 in the inner wall of socket 4, preventing rotation of pole 3 relative to socket 4 as suggested by double headed arrow R. In this example, projection 10 is provided by an end of a pin 14 inserted diametrically into first pole end 2 through a hole 16.

Figure 1C:
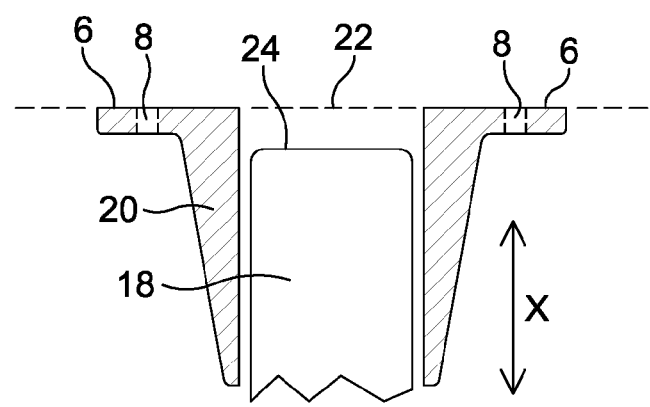
FIG. 1C shows in cross section elevation the other end of the hand pole and socket arrangement of FIGS. 1A and 1B.

The arrangement shown in FIGS. 1A and 1B has the disadvantage that any significant vertical play required due to changing distance between socket 4 and a socket at the other end of hand pole 3 will not be accommodated at first pole end 2. However, as shown in schematic cross section FIG. 1C, a second pole end 18 distal to the first pole end 2 may be fitted in a second socket 20 for attaching via bolt holes 8 to a ceiling of a passenger vehicle (suggested by a dashed line 22). Second socket 20 has generally the same form as that of first socket 4 but without depression 12. Second pole end 18 does not feature a radial projection. The second pole end 18 fits inside second socket 20 but is free to move vertically as suggested by double headed arrow X with the second pole end 18 moving in captive sliding engagement relative to second socket 20. An extreme end 24 of pole end 18 is spaced below the ceiling level 22 so as to allow some upwards movement in use.

Figure 2A:
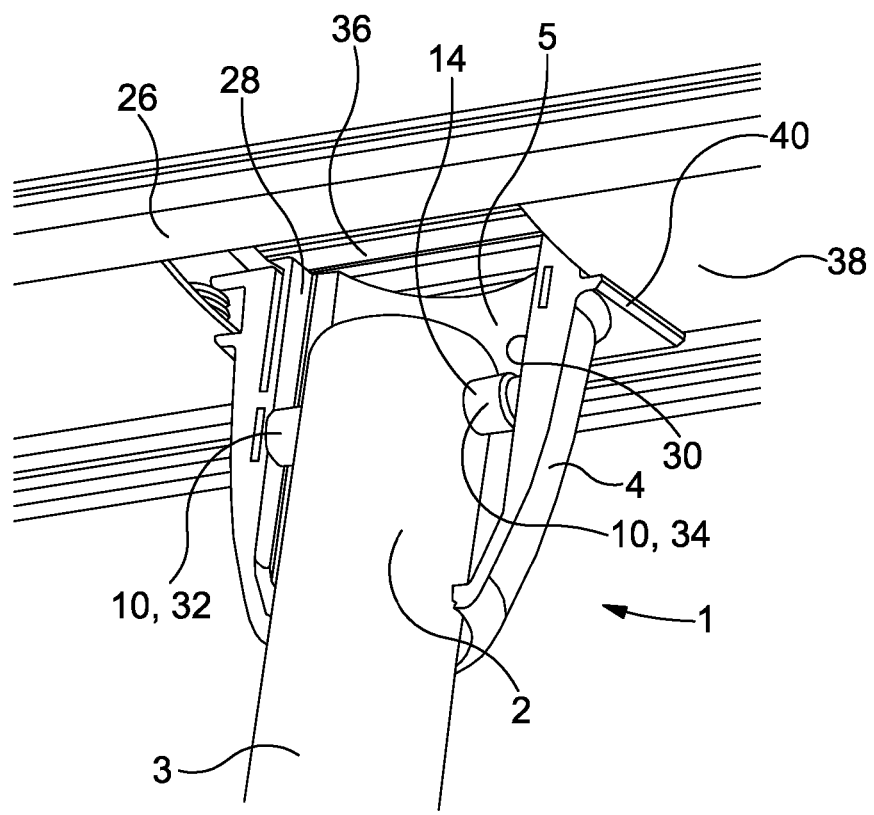
FIG. 2A shows in perspective cut away detail another hand pole and socket arrangement.

FIG. 2A shows, in a detail perspective cut away view, an end of a hand pole and socket arrangement 1 fitted into a ceiling fitment 26 of the ceiling of a passenger vehicle. The hand pole end and socket arrangement 1 includes the first pole end 2 of a curved hand pole 3 (see wider view 2B) located in a first socket 4 which is shown cut away to allow viewing of the first pole end 2 in the interior. The socket 4 has a generally cylindrical inner surface wall 5, which includes two axially extending grooves 28, 30. The grooves 28, 30 each receive a projection 10 in the form of either end 32, 34 of a spring loaded pin 14 passing diametrically through the first pole end 2.

In this example, both ends 32, 34 of the pin 14 are spring loaded so that each is independently resiliently biased towards its corresponding groove 28, 30. In use, the pin ends 32, 34 prevent relative rotation of the pole 3 and the socket 4, whilst at the same time allowing relative axial motion as the pin ends 32, 34 can move up and down in the grooves 28, 30.

The other end of pole 3 will typically be connected by fitting into a suitable socket or clamp arrangement on the floor or on a seat back of the passenger vehicle.

The socket 4 is shown fitting into a channel (groove) 36 of ceiling fitment 26, with a cover sheeting 38 providing a cover finish to the channel 36 where hand poles or other fittings to the ceiling are not required. A transverse groove on the exterior of the socket 4 includes a lip 40 into which the cover sheeting 38 fits to complete a tidy appearance (see FIG. 2A).

Figure 2B:
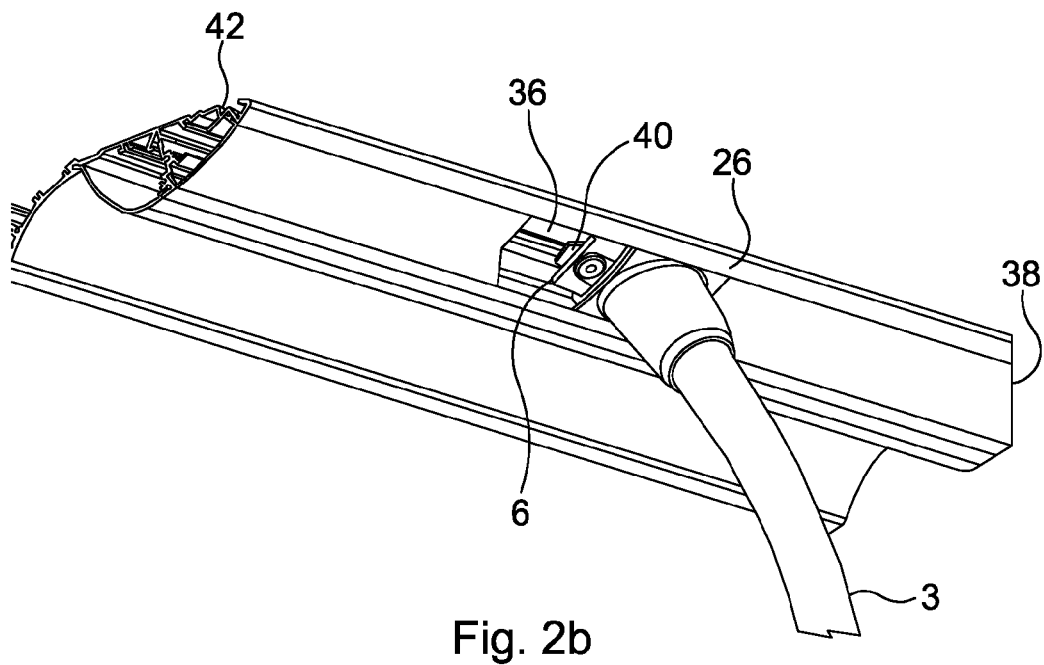
FIG. 2B shows a perspective view of the hand pole and socket arrangement of FIG. 2A.

The socket is attached to the ceiling fitment by means of flanges 6 (such as found on the sockets 4 of FIG. 1A), bolted into channel 36 by making use of captive nuts 40 held in a sub channel 42 of channel 36 (see FIG. 2B).

Figure 2C:
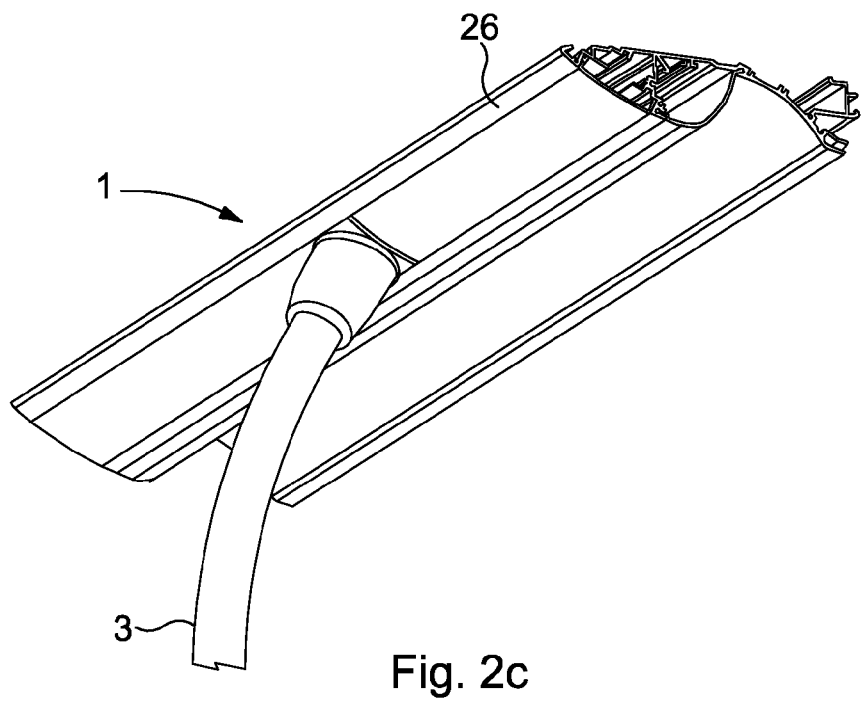
FIG. 2C another perspective view of the hand pole and socket arrangement of FIG. 2A.

FIG. 2C shows another perspective view of arrangement 1 as shown in FIGS. 2A, 2B, but without cut away at the pole to allow viewing of interior parts. This illustrates the tidy design possible with the arrangements of the invention, without exterior fixing components.

The arrangement of FIG. 2 provides a robust, non-rotating yet axially extendible hand pole and socket for fitting to a ceiling or other suitable location in a passenger vehicle.

The invention claimed is:

1. A hand pole and socket arrangement for use in a passenger service vehicle, the arrangement comprising:
    a hand pole having a first end and a second end; and
    a first socket for fitting to a passenger vehicle and for receiving the first end of the hand pole for preventing relative rotation of the first socket relative to the first end of the hand pole, said first socket having an interior wall with at least one of the following:
        the first end of the hand pole having a radially outwardly extending first projection and the interior wall of the first socket having a corresponding radially outwardly extending first depression; and
        the first socket having a radially inward extending first projection on the interior wall, and the first end of the hand pole having a corresponding radially inward extending first depression.

2. The hand pole and socket arrangement according to claim 1, wherein:
    the first end of the hand pole has a radially outwardly extending second projection, and the interior wall of the first socket has a corresponding radially outwardly extending second depression,
        wherein the second projection and the corresponding second depression are diametrically opposed to the first projection and the corresponding first depression; and
    the second projection fits in the second depression preventing relative rotation of the first socket and first pole end in use.

3. The hand pole and socket arrangement according to claim 1, wherein:
    the first socket has a radially inward extending second projection on the interior wall, and the first end of the hand pole has a corresponding radially inward extending second depression,
        wherein the second projection and the corresponding second depression are diametrically opposed to the first projection and the corresponding first depression; and
    the second projection fits in the second depression preventing relative rotation of the first socket and first pole end in use.

4. The hand pole and socket arrangement according to claim 1, wherein the first projection is resiliently biased towards the corresponding first depression.

5. The hand pole and socket arrangement according to claim 4 wherein the first projection is spring loaded.

6. The hand pole and socket arrangement according to claim 1, wherein at least one of:
    the corresponding radially outwardly extending first depression on the interior wall of the first socket; and
    the corresponding radially inward extending first depression on the first end of the hand pole has an axially extending groove.

7. The hand pole and socket arrangement according to claim 6 wherein the corresponding radially outwardly extending first depression is provided on the interior wall of the first socket and wherein the first projection takes the form of a spring loaded pin, having a pin body and at least a first end that can move inwardly and outwardly with respect to the pin body, the spring loaded pin being inserted radially into the first end of the hand pole transverse to its longitudinal axis.

8. The hand pole and socket arrangement according to claim 7, wherein:
    the spring loaded pin is inserted through a diameter of the first end of the hand pole to provide the first and second diametrically opposed outward projections; and
    the interior wall of the first socket further comprises a radially outwardly extending second depression in the form of an axially extending second groove that is diametrically opposed to the axially extending first groove, wherein each of the first and second diametrically opposed outward projections fit into a corresponding one of the diametrically opposed axially extending first and second grooves on the interior wall of the first socket.

9. The hand pole and socket arrangement according to claim 8 wherein the spring loaded pin is double ended, having a pin body, and first and second ends each of which can move inwardly and outwardly with respect to the pin body.

10. The hand pole and socket arrangement according to claim 1, wherein the hand pole is generally vertically disposed in use and the first socket and first end of the hand pole are uppermost in use.

11. The hand pole and socket arrangement according to claim 1, wherein the second end of the hand pole is circular in cross section and the arrangement further comprises a second socket, wherein the second end of the hand pole fits in use to the second socket that receives and holds the second end when fitted in a suitable location in a passenger vehicle.

12. The hand pole and socket arrangement according to claim 1, further comprising:

a second socket for fitting to a passenger vehicle and for receiving the second end of the hand pole, said second socket having an interior wall, wherein the second end of the hand pole has at least one of:

a radially outwardly extending first projection and the interior wall of the second socket having a corresponding radially outwardly extending first depression; and the second socket having a radially inward extending first projection on the interior wall and the second end of the hand pole having a corresponding radially inward extending first depression, wherein the first projection fits in the first depression preventing relative rotation of the second socket and second pole end in use.

13. The hand pole and socket arrangement according to claim 1, wherein the arrangement further comprises a second socket, wherein the second end of the hand pole is clamped in use into the second socket when fitted in a suitable location in a passenger vehicle.

14. The hand pole and socket arrangement according to claim 1, wherein the first socket includes flanges extending laterally of the socket for attachment to a surface.

15. The hand pole and socket arrangement according to claim 14 further including a ceiling fitting for fitting to the ceiling of a passenger service vehicle, the ceiling fitting including a groove formed to allow attachment of the socket at any point along the groove.

16. The hand pole and socket arrangement according to claim 15 further comprising a protective and/or decorative sheeting that covers the flanges extending laterally of the socket.

17. A passenger service vehicle comprising a hand pole and socket arrangement according to claim 1.

18. The passenger service vehicle of claim 17 wherein the passenger service vehicle is selected from the group consisting of buses, coaches, trams, trains, boats and ships.

* * * * *